(12) United States Patent
Hazard

(10) Patent No.: US 11,010,672 B1
(45) Date of Patent: May 18, 2021

(54) EVOLUTIONARY TECHNIQUES FOR COMPUTER-BASED OPTIMIZATION AND ARTIFICIAL INTELLIGENCE SYSTEMS

(71) Applicant: Diveplane Corporation, Raleigh, NC (US)

(72) Inventor: Christopher James Hazard, Durham, NC (US)

(73) Assignee: Google LLC, Mountain View, CA (US)

( * ) Notice: Subject to any disclaimer, the term of this patent is extended or adjusted under 35 U.S.C. 154(b) by 802 days.

(21) Appl. No.: 15/694,586

(22) Filed: Sep. 1, 2017

(51) Int. Cl.
*G06F 15/18* (2006.01)
*G06N 3/00* (2006.01)
*G06N 3/12* (2006.01)

(52) U.S. Cl.
CPC .................... *G06N 3/126* (2013.01)

(58) Field of Classification Search
CPC ..................................... G06N 3/126
See application file for complete search history.

(56) References Cited

U.S. PATENT DOCUMENTS

| | | | |
|---|---|---|---|
| 7,873,587 B2 * | 1/2011 | Baum | G06N 20/00 706/46 |
| 2006/0195204 A1 * | 8/2006 | Bonabeau | G06N 3/126 700/83 |

OTHER PUBLICATIONS

Journal of Information Science and Engineering 18, 163-186 (2002) Fuzzy Modeling Employing Fuzzy Polyploidy Genetic Algorithms, Ming-Da Wu and Chuen-Tsai Sun (Year: 2002).*
Haploid-Diploid Evolutionary Algorithms: The Baldwin Effect and Recombination Nature's Way, Larry Bull (Year: 2017).*

* cited by examiner

*Primary Examiner* — Kakali Chaki
*Assistant Examiner* — Su-Ting Chuang
(74) *Attorney, Agent, or Firm* — Dority & Manning PA.

(57) ABSTRACT

Techniques are provided for evolutionary computer-based optimization and artificial intelligence systems, and include receiving first and second candidate executable code (with ploidy of at least two and one, respectively) each selected at least in part based on a fitness score. The first candidate executable code and the second candidate executable code are combined to produce resultant executable code of the desired ploidy. A fitness score is determined for the resultant executable code, and a determination is made whether the resultant executable code will be used as a future candidate executable code based at least in part on the third fitness score. If an exit condition is met, then the resultant executable code is used as evolved executable code.

19 Claims, 5 Drawing Sheets

EVOLUTIONARY TECHNIQUES FOR COMPUTER-BASED OPTIMIZATION AND ARTIFICIAL INTELLIGENCE SYSTEMS

FIELD OF THE INVENTION

The present invention relates to computer-based optimization and artificial intelligence techniques and in particular to evolutionary techniques for computer-based optimization and artificial intelligence systems.

BACKGROUND

Computer operation and automation is ubiquitous in almost every aspect of society today. These programs, or other methods of operation provide increased speed, automation, and in many cases, convenience. Behind these increases in speed, automation, and convenience, are programmers performing the tasks of devising and executing on what they hope to be increases in speed, automation, and convenience.

In the context of the individual programmer, team of programmers, and corporate teams devising the improvements, there is a natural limit to the improvements that will be made. For example, if a programmer would like to improve the realism of game-playing of a particular artificial-opponent system (e.g., a computer program that allows a user to "play against the computer"), the programmer will have to walk through, step-by-step to come up with new programmatic game approach. The approaches the programmer takes is naturally limited along a number of dimensions, such as the time available for writing and debugging different approaches, as well as the creativity and knowledge of the programmer. The techniques described herein address some of these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for evolutionary computer-based optimization and artificial intelligence systems. The techniques include receiving first candidate executable code that is selected at least in part based on a first fitness score for the first candidate executable code and where the ploidy of the first candidate executable code is at least two. Second candidate executable code is also received, and is is selected at least in part based on a second fitness score for the second candidate executable code. The ploidy of the second candidate executable code is at least one.

Once a desired ploidy of resultant executable code is received, then the first candidate executable code and the second candidate executable code are combined to produce resultant executable code of the desired ploidy. A third fitness score is determined for the resultant executable code, and a determination is made as to whether the resultant executable code will be used as a future candidate executable code based at least in part on the third fitness score. If an exit condition is met, then the resultant executable code will be used as evolved executable code.

In some embodiments, the first candidate executable code is diploid candidate executable code and the second candidate executable code is haploid executable code, and the first candidate executable code has twice as much executable code as the second candidate executable code. If the desired ploidy of the resultant executable code is one, then combining the first candidate executable code and the second candidate executable code comprises combining two halves of the diploid candidate executable code to produce resultant executable code. If the desired ploidy of the resultant executable code is two, then combining the first candidate executable code and the second candidate executable code comprises combining the two halves of the diploid candidate executable code to produce a first half of the diploid candidate executable code to produce one half of the resultant executable code and copying the haploid candidate executable code to produce a second half of the resultant executable code.

In some embodiments, determining the third fitness score for the resultant executable code comprises processing inputs using resultant executable code to determine the third fitness score. In some embodiments, the resultant executable code is mutated before determining the third fitness score for the resultant executable code. If desired ploidy of the resultant executable code is two, then determining the third fitness score can include executing executable elements of a first half of the resultant executable code, a second half of the resultant executable code, and determining the third fitness score based at least in part on the two results. A fitness score for executable code may be a measure of a performance characteristic of the executable code. Further, the fitness score for executable code may have a phase out characteristic related to previous measures of performance characteristic of the executable code and/or may include a random factor that alters the fitness score randomly.

In some embodiments, the received desired ploidy is one of haploid or diploid, and is selected randomly and/or may be selected based at least in part on a desired ratio of haploid and diploid resultant executable code. The exit condition can be based at least in part on one of the third fitness score and a number of iterations.

Some embodiments include receiving haploid candidate executable code that is selected at least in part based on a first fitness score for the haploid candidate executable code; receiving diploid candidate executable code that is selected at least in part based on a second fitness score for the diploid candidate executable code; and receiving a selection of desired ploidy of resultant executable code. If the desired ploidy is haploid, then the diploid candidate executable code may be processed to form a resultant executable code; if it is diploid, then the diploid candidate executable code may be processed to form an intermediate haploid executable code, and the intermediate haploid executable code and the haploid candidate executable code may be processed to form resultant diploid resultant executable code.

In some embodiments, a third fitness score may be determined for the resultant executable code; and determining whether the resultant executable code will be used as a future candidate executable code may be based at least in part on the third fitness score. If an exit condition is met, then indicating the resultant executable code as the evolved executable code based at least in part on the exit condition being met.

DETAILED DESCRIPTION

Figure 1:
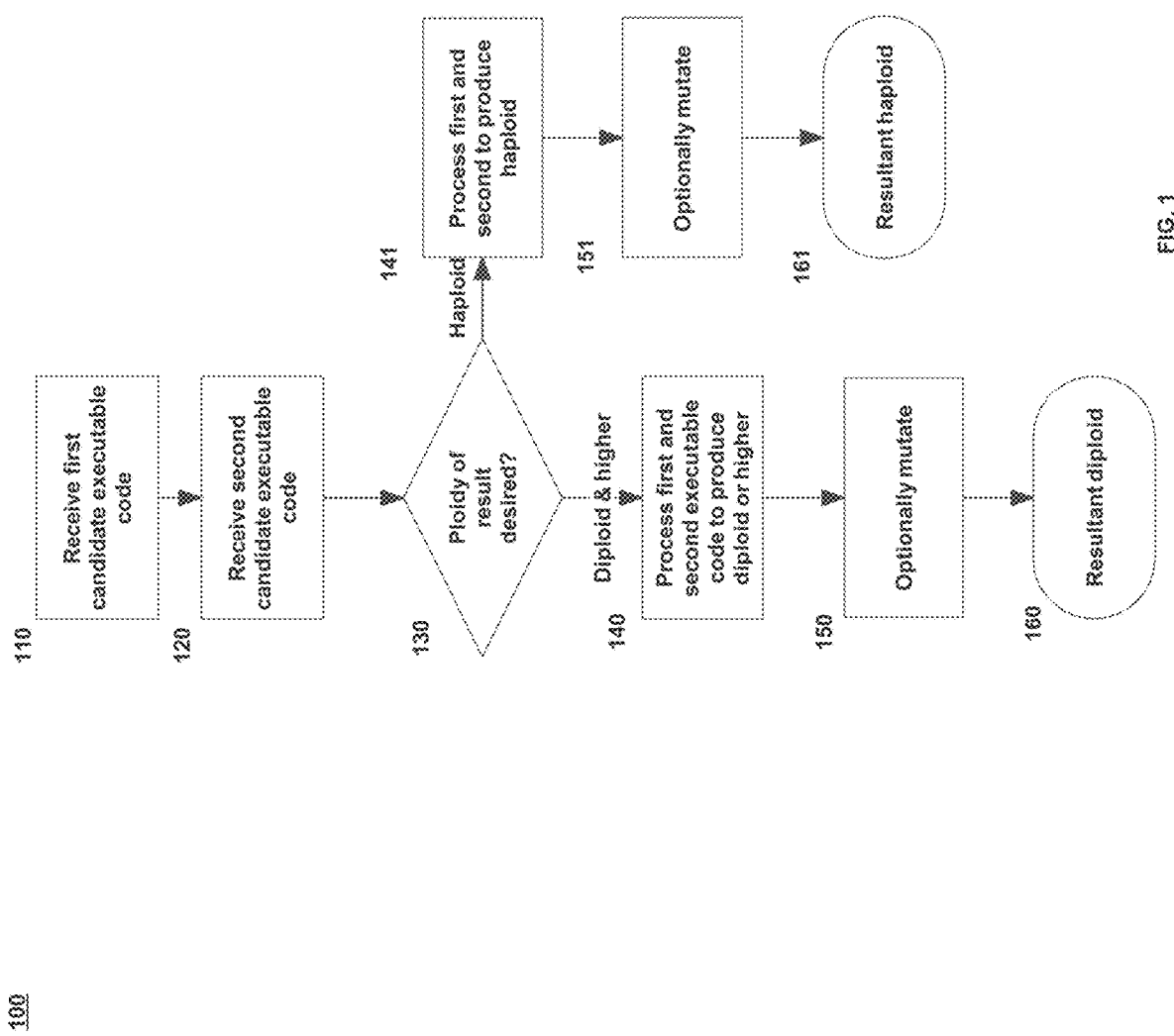
FIG. 1 depicts an example process for a single stage of evolution of executable code.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Some code is written from start to finish, debugged, launched, and executed. It is only updated later if bugs are found, improvements are needed, etc. The techniques herein take a different approach, and evolve code based on the "fitness" of the code before it is finalized and launched. Some of the evolutionary techniques herein could be described generally as genetic programming techniques. The techniques provide for a dramatic improvement over experimentation by programmers on new versions of code, which can take hundreds or thousands of hours for development and testing. Further, the techniques herein also provide for experimentation along lines and in ways that programmers typically would not try. In many cases, these farfetched executable code experiments attempted by the techniques herein will fail, but sometimes they could provide algorithmic or other breakthroughs that programmers might not have found.

The techniques described herein provide for evolution of candidate executable code in a manner that provides simultaneously for stability of improvements in the candidate code and allowance for experimentation in the candidate executable code. In some embodiments, this is accomplished by using a population of candidate executable code sets, pairing high-performing executable code from one set with high performing executable code from another set and mutating the resultant code to produce further candidate executable code sets.

As a simple example, consider a set of candidate code sets that play a game of tic-tac-toe, where the tic-tac-toe board is addressed in this manner:

{(0,0) (0,1) (0,2)
(1,0) (1,1) (1,2)
(2,0) (2,1) (2,2)}

One initial candidate executable code set, for example a diploid code set (e.g., a grouping of two sets of executable code, where each may be able to completely perform the desired task) for playing tic tac toe might perform the following steps (written in pseudo code):

a. Set 1.A:
i. if ISEMPTY(1,1), PLACESYMBOL (1,1)
ii. else if ISEMPTY(0,0), PLACESYMBOL (0,0)
iii. else if ISEMPTY(0,1), PLACESYMBOL (0,1)
iv. . . .
b. Set 1.B:
i. if ISEMPTY(1,1), PLACESYMBOL (1,1)
ii. else if ISEMPTY(0,2), PLACESYMBOL (0,2)
iii. else if ISEMPTY(1,0), PLACESYMBOL (1,0)
iv. . . .

A second candidate executable code set, for example a haploid executable code set might be a. Set 2.A (only set):
i. if ISEMPTY(0,0), PLACESYMBOL (0,0)
ii. else if ISEMPTY(0,1), PLACESYMBOL (0,1)
iii. else if ISEMPTY(0,2), PLACESYMBOL (0,2)
iv. . . .

Combining these two executable code sets may entail, if a diploid resultant (e.g., "child") code set is desired, then the diploid candidate (e.g., "parent") executable code Sets 1.A and 1.B may be combined in order to produce one of the desired resultant code sets for the resultant diploid code set, and the haploid candidate may be used for the other of the desired resultant diploid code sets. For example:

a. Resultant diploid code set Resultant.A:
i. (was 1.A.i) if ISEMPTY(1,1), PLACESYMBOL (1,1)
ii. (was 1.B.ii) else if ISEMPTY(0,2), PLACESYMBOL (0,2)
iii. (was 1.A.iii) else if ISEMPTY(0,1), PLACESYMBOL (0,1)
iv. . . .
b. Resultant diploid code set Resultant.B:
i. (was 2.A.i) if ISEMPTY(0,0), PLACESYMBOL (0,0)
ii. (was 2.A.ii) else if ISEMPTY(0,1), PLACESYMBOL (0,1)
iii. (was 2.A.iii) else if ISEMPTY(0,2), PLACESYMBOL (0,2)
iv. . . .

If a haploid resultant ("child") code set is desired, then the two code sets of the diploid candidate set may be combined to form the resultant haploid code set. In such situations, it may be the case that the haploid candidate (or parent) code set is not used to produce the resultant candidate code set. Using the tic-tac-toe example above, the resultant haploid candidate code might be the mix of the diploid set A and the diploid set B, such as:

a. Resultant haploid set A (only set):
i. (was 1.A.i) if ISEMPTY(1,1), PLACESYMBOL (1,1)
ii. (was 1.B.ii) else if ISEMPTY(0,2), PLACESYMBOL (0,2)
iii. (was 1.A.iii) else if ISEMPTY(0,1), PLACESYMBOL (0,1)
iv. . . .

Further each of these resultant code sets can be mutated along various parameters. For example, new commands might be inserted, commands might be deleted or changed, variables might be altered, etc. For example, the resultant haploid code set A might be mutated with respect to the parameters passed, such as replacing one of the integer parameters with a random integer (underlined for emphasis):

a. Mutated resultant haploid set A (only set):
i. (was 1.A.i) if ISEMPTY(1,1), PLACESYMBOL (1,1)
ii. (was 1.B.ii) else if ISEMPTY(0, RANDOM_INTEGER(0 . . . 2)), PLACESYMBOL (0, RANDOM_INTEGER(0 . . . 2))
iii. (was 1.A.iii) else if ISEMPTY(0,1), PLACESYMBOL (0,1)
iv. . . .

Candidate sets of executable code can be executed and the fitness of the results might be determined. For example, in the context of tic tac toe, a winning game might be considered worth 50 points, a draw 40 points, and loss might be worth the number of moves made before losing. Errors occurring (e.g., an illegal move made) might deduct from the score. Further, fitness might be a measure of scores of one or more of the parents combined with the fitness of the code set currently being tested, and/or the fitness score might be modified at random, introducing more variation.

In some embodiments, the choice of whether to produce a haploid or diploid candidate result set from previous "parents" might be random choice in various embodiments and may be based on a desired ratio of haploid and diploids in the population being tested (e.g., 50%/50% or 80%/20%).

In order to execute diploid (or higher ploidy) resultant executable code, various techniques may be used, as described below. There may be mixture or crossover between the results of each side of the diploid executable code, the results of one side or other may be used at random, a voting mechanism may be used, and/or invalid results from one side may be discarded and valid results from the other side may be used. If the results from the two sides are the same, then that result may be used.

Single Stage of Executable Code Evolution

FIG. 1 depicts an example process for a single stage of evolution of executable code. In the pictured example, the candidate executable code will generally be described as either haploid or diploid, but as discussed below with respect to FIG. 4, the candidate executable code can be of a variety of forms including diploid and diploid, triploid and diploid, triploid and haploid, etc.

Figure 3:
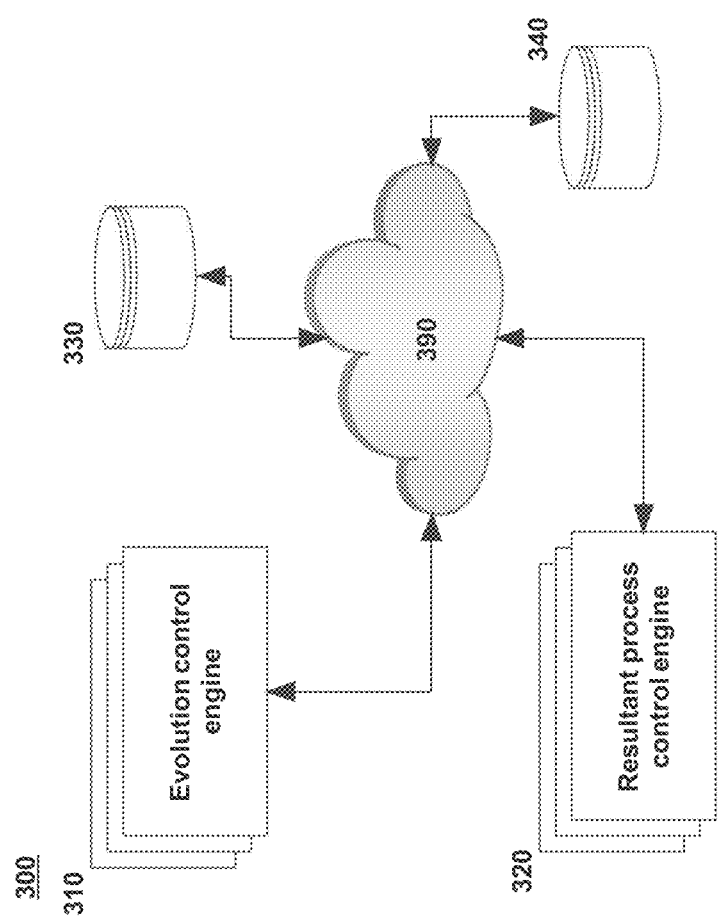
FIG. 3 depicts an example system for executable code evolution.

Returning again to FIG. 1, first candidate executable code is received 110 and second candidate executable code is received 120. Referring to FIG. 3, receiving 110 and 120 the candidate executable code may entail receiving 110 and 120 the executable code at, for example, an evolution control engine 310. The received code may be stored in storage 330 or 340, which is communicatively coupled to the evolution control engine 310.

The received executable code may be haploid, diploid, triploid, etc. Haploid executable code may have a single set of executable code, diploid executable code may have two sets of executable code triploid may have three sets, etc. Each set of executable code may be able to perform (or attempt to perform) the entire function desired. For example, using the tic-tac-toe example, a haploid executable code set may have one set of code capable of playing tic tac toe against an opponent, a diploid may have two such sets, triploid three such sets, etc. The received sets of executable code may have one or more sets of executable code depending on whether the received executable code sets are haploid, diploid, triploid, etc.

An indication is received 130 of the desired ploidy of the resultant executable code. The ploidy may indicate how many sets of executable code may be in the desired resultant executable code. For example, if the ploidy is one, then haploid resultant code is desired. If the ploidy is two or three, then haploid or triploid code is desired, respectively. In some embodiments, the indication may be received 130 by accessing a setting or variable, or it may be determined randomly or semi-randomly. For example, if the desired ploidy of the resultant code is always one, then receiving 130 the indication may include accessing a variable, settings file, etc. indicating the ploidy of one. If a mix of ploidies is desired, then, for example, receiving an indication of the ploidy may include receiving a randomly or semi-randomly generated indication of the ploidy. It may be the case, for example, that a desired ratio of ploidy of the resultant code (which may later be candidate code) is X % ploidy one and (100−X) % ploidy two or X % ploidy one, Y % ploidy two, and (100−X−Y) % ploidy three. A system, such as evolution control engine 310 in FIG. 3, may indicate ploidies for subsequent executions of process 100 by spreading those ploidies over the desired ploidy distribution. Such distribution may be implemented using a random number generator and applying the results to obtain the desired distribution (e.g., if RANDOM[0 . . . 1] is used, and its result is in the range, [0 . . . X/100], then ploidy one might selected and otherwise, ploidy two). Other techniques could also be used, such as specific sequencing of ploidy indications, such as [one, two, two, two, one, one, two, two, two, two] to achieve a 30/70 split between ploidy one and two.

FIG. 1 depicts two possible received 130 desired ploidy indications: haploid and diploid and higher. In some embodiments, different and/or more ploidies might be possible. For example, an indication of ploidy one and three might be the two possible ploidies; one, two and three, together; or two, five and nine, etc. For clarity, the discussion herein will primarily concentrate on received 130 indications one (haploid) and two (diploid).

If a ploidy of two or higher is received 130, then the first and second candidate executable code are processed 140 in order to produce diploid or higher ploidy resultant code. If a ploidy of one is received 130, then the first and second candidate executable code are processed 141 in order to produce haploid resultant code. There are many ways in which the first and second candidate executable code may be processed 140 or 141. For example, in order to process 140 to produce resultant diploid executable code, the process 100 may include processing the first candidate executable code to produce the first of the two halves of the resultant diploid executable code and processing the second candidate executable code to produce the second of the two halves of the resultant diploid executable code.

In some embodiments, for example, the first candidate executable code may be haploid and the second candidate executable code may be diploid. If the received 130 desired ploidy of the resultant code is haploid, then the processing 141 may include processing just the second, diploid candidate executable code to produce the resultant haploid candidate executable code. The processing of diploid executable code to produce haploid executable code may include mixing, crossing over, or choosing portions of each half of the diploid candidate executable code in order to produce a single, haploid resultant executable code. Using the tic tac toe example, the processing 141 might result as:

a. Resultant haploid set A (only set):
  i. (was 1.A.i) if ISEMPTY(1,1), PLACESYMBOL (1,1)
  ii. (was 1.B.ii) else if ISEMPTY(0,2), PLACESYMBOL (0,2)
  iii. (was 1.A.iii) else if ISEMPTY(0,1), PLACESYMBOL (0,1)
  iv. . . .

It is also possible that the resultant haploid executable code is a combination of one or both halves of the diploid candidate code and the haploid candidate code. For example, if the resultant haploid executable code set was based on both halves of the diploid candidate executable code and the haploid candidate executable code, the result may be:

a. Resultant haploid set A (only set):
  i. (was 1.A.i) if ISEMPTY(1,1), PLACESYMBOL (1,1)
  ii. (was 1.B.ii) else if ISEMPTY(0,2), PLACESYMBOL (0,2)
  iii. (was 2.A.iii) else if ISEMPTY(0,2), PLACESYMBOL (0,2)
  iv. . . .

If the received 130 indication is diploid or higher, then the first and second candidate executable codes are processed 140 to produce a diploid (or higher ploidy) resultant executable code. For example, if diploid resultant executable code is desired, each half of the resultant diploid executable code may be produced in as described above with respect to 141 and may result in each half of the resultant executable code being a combination of one or the other of the first and second candidate executable codes. For example, one half of the resultant diploid executable code may be a combination of the diploid candidate executable code and the second half of the resultant executable code may be a copy of the haploid candidate executable code. For example, using the tic tac toe example above, the resultant diploid executable code may be:

a. Resultant diploid code set Resultant.A:
  i. (was 1.A.i) if ISEMPTY(1,1), PLACESYMBOL (1,1)
  ii. (was 1.B.ii) else if ISEMPTY(0,2), PLACESYMBOL (0,2)
  iii. (was 1.A.iii) else if ISEMPTY(0,1), PLACESYMBOL (0,1)
  iv. . . .
b. Resultant diploid code set Resultant.B:
  i. (was 2.A.i) if ISEMPTY(0,0), PLACESYMBOL (0,0)
  ii. (was 2.A.ii) else if ISEMPTY(0,1), PLACESYMBOL (0,1)
  iii. (was 2.A.iii) else if ISEMPTY(0,2), PLACESYMBOL (0,2)
  iv. . . .

In other examples, each half of the resultant diploid executable code may be a combination of either or both halves of the diploid candidate executable code and/or the haploid candidate executable code. For example, in the tic tac toe example, the resultant executable code may be:

a. Resultant diploid code set Resultant.A:
  i. (was 1.A.i) if ISEMPTY(1,1), PLACESYMBOL (1,1)
  ii. (was 1.B.ii) else if ISEMPTY(0,2), PLACESYMBOL (0,2)
  iii. (was 2.A.iii) else if ISEMPTY(0,2), PLACESYMBOL (0,2)
  iv. . . .
b. Resultant diploid code set Resultant.B:
  i. (was 2.A.i) if ISEMPTY(0,0), PLACESYMBOL (0,0)
  ii. (was 2.A.ii) else if ISEMPTY(0,1), PLACESYMBOL (0,1)
  iii. (was 1.A.iii) else if ISEMPTY(0,1), PLACESYMBOL (0,1)
  iv. . . .

Figure 4:
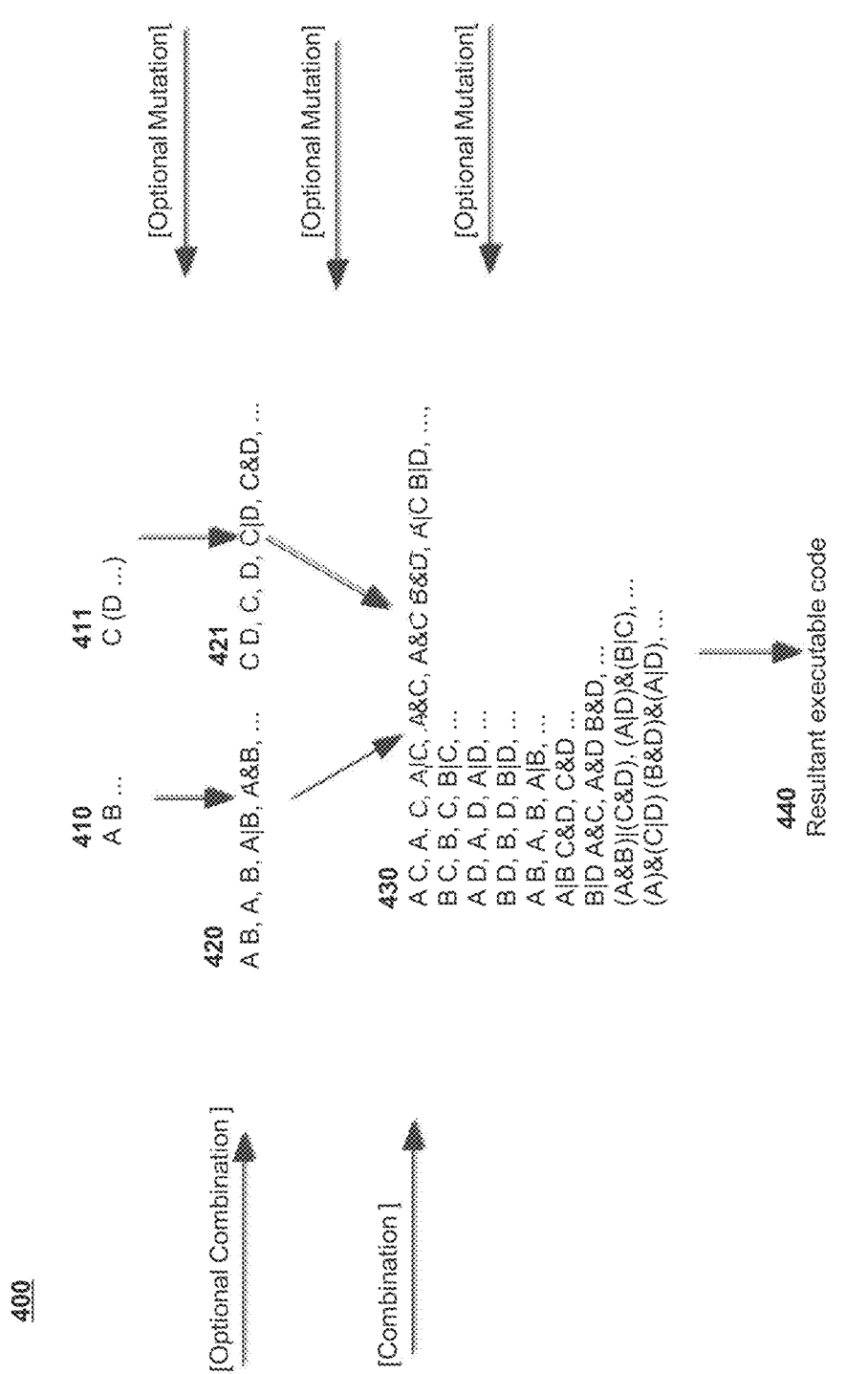
FIG. 4 depicts an example diagram for executable code evolution.

As discussed herein with respect to FIG. 4 and elsewhere, if higher (three or more) ploidy resultant executable code is desired, then the first and second candidate executable code may be processed 140 to produce that higher ploidy executable code (with each code set in the higher ploidy code set being produced using the processes and techniques described herein), and then optionally mutated 150.

In some embodiments, the first and or second candidate executable code may be mutated 150 and 151 after or before (not pictured in FIG. 1) its processing 140 or 141. Examples of mutations may include changing variables or constants used in the code (including changing constants into variables and vice-versa), changing functions used, adding or removing code, including adding or removing functions, operators, variables, constants, lines or code, etc. In some cases, mutations may cause candidate code to become invalid, produce bad results, etc. The mutations may also cause the candidate code to produce different results. In some cases, the candidate code may produce the same results notwithstanding the mutation.

After optional mutation 150 and 151, the resultant executable code is made available 160 and 161. Making the resultant executable code available 160 and 161 may include storing the resultant executable code in a particular location, indicating with a flag or variables that the resultant executable code has been made available, or any other appropriate mechanism.

Example Types of Executable Code Evolution

FIG. 4 is an example diagram for executable code evolution.

Looking briefly to FIG. 1, first candidate executable code and second candidate executable code that are haploid and diploid are primarily discussed. The resultant executable code is primarily discussed as either haploid or diploid as well. As depicted in FIG. 4, there are many possible combinations of candidate executable code 410 and 411 that are possible, as well as many types of resultant executable code 440. In the diagram depicted in FIG. 4, candidate executable code 410 and 411 can be ploidy of one, two, or more. For example, in some embodiments, the first candidate executable code 410 may be haploid or higher and the second candidate executable code 411 may be diploid or higher ploidy. As discussed with respect to FIG. 1, candidate executable code 410 and 411 may optionally be mutated either before or after an optional combination (for each, just with the candidate executable code itself, resulting in candidate executable code 420 and 421) and/or before or after the combination of the two candidate executable code sets into executable code set 430. The results of the combination of the two candidate executable code sets 430 may also be mutated before it becomes resultant executable code 440. Further, in some embodiments, there may be more than two candidate executable code sets 410 and 411 (with additional candidate executable code sets not pictured).

As depicted in FIG. 4, candidate executable code sets 410 and 411 may be combined separately to form candidate executable code sets 420 and 421, respectively. Candidate executable code sets 420 and 421 might also be termed interim candidate executable code sets 420 and 421.

In FIG. 4, four operators or notations are used. These operators or notations may take on many different meanings, and might represent numerous functions, ways of combining code sets, etc. Here are some examples of uses of the operators or notations for a diploid candidate executable code set A B:

a. "A B"—keep both A and B as a diploid candidate executable code.
b. "A" or "B"—keep A or B, respectively, as haploid candidate executable code.
c. "A|B"—either A or B will be kept as haploid candidate executable code, but not both.
d. "A&B"—a crossover operation is performed on the two candidate executable code sets. The crossover operations may select one or multiple sections of each candidate executable code set to produce a single candidate executable code set.

Additional operators, not pictured might be used, and may build on those above. For example:

a. "A&B A|B"—first code set of the diploid result is "A&B" and the second code set is "A|B"
b. "A B A&B B&A"—the first code set of a quadraploid candidate executable code is A, the second is B, the third is A&B, and the fourth is B&A, where A&B might represent a different random crossover than B&A.

Returning to FIG. 4, the optional combinations of candidate executable code 420 and 421, and/or the initial candidate executable code sets 410 and 411 may be combined to a resultant executable code set 430 (which might also be termed, for example, interim candidate executable code 430 or interim resultant executable code 430). In FIG. 4, the candidate executable code 420 and candidate executable code 421 may be combined to produce resultant executable code 430. As depicted in the figure, such a combination can take many forms. For example, each candidate executable code 420 and 421 may form half of a diploid resultant executable code 420 such as "A C", "B D", "B|D A&C", "A|B C&D", etc. Further, candidate executable code 420 and 421 may be combined to form a haploid resultant executable code 430, such as "A", "B", "C", "D", "A&B", "(A&B)|(C&D)", "(A|D)&(B|C)", etc. In some embodiments, not pictured in FIG. 4, the resultant executable code 430 may be triploid or higher ploidy, and be a combination of any of candidate executable code 410, 411, 420, and 421, such as "A B C D&A&B" quadraploid candidate executable code.

Example Process for Repeated Evolution of Executable Code

Figure 2:
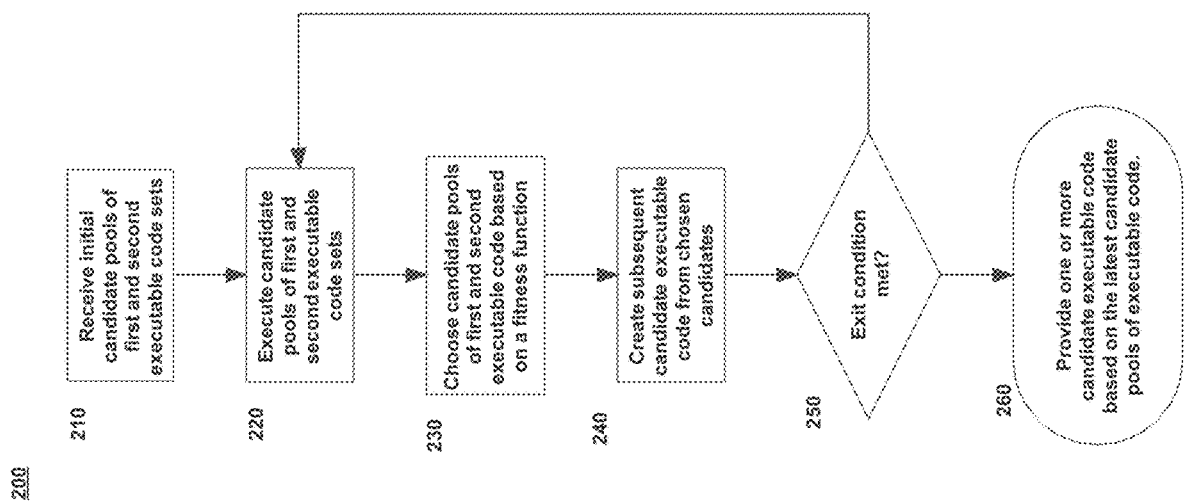
FIG. 2 depicts an example process for repeated executable code evolution.

FIG. 2 depicts an example process 200 for repeated executable code evolution.

Initial pools of first and second candidate executable code are received 210. Receiving 210 the candidate executable code sets may include retrieving them from a storage medium, receiving them as part of a package, etc. The first and second candidate executable code sets may be programmed by human programmers to start, or may have been generated by other means, such as using the techniques described herein. For example, a programmer or programming team may develop many tic tac toe candidate executable code sets. These may be developed based on what each programmer thinks is a good algorithm for playing tic tac toe, may be developed to represent a diversity of tic tac toe algorithms or approaches, or using any other methodology and/or motivation.

In each cycle of process 200, the candidate executable code sets are executed 220. In some embodiments, executing candidate code sets may include running the code set in isolation, "against" other individual code sets, in a competitive environment against multiple other code sets, against human competitors, and the like. For example, in some embodiments, the candidate executable code will be of the type that it will be appropriate to run the code in relative isolation (not against other candidate executable code), but instead against benchmarks or known inputs. For example, if the candidate executable code is related to image processing, the candidate executable code may be run against a database of known images to see how the candidate executable code performs on the known images (e.g., the related fitness function may be based on the number of objects it correctly identifies, speed at which it identifies, etc.). In the tic tac toe and other examples, it may be useful to run the candidate executable code against one other candidate executable code or multiple other candidate executable code to see how many wins, losses, and draws the candidate executable code has, and develop a fitness function based on those results. In some embodiments, candidate executable code like the tic tac toe candidate executable code might be run against one or more particular code sets, and those code sets may be a "standard" against which all candidate executable code sets are run.

In some embodiments, if candidate executable code has ploidy one, it may run the one set of candidate executable code in the candidate executable code. If the ploidy is higher than one, all of the sets of executable code in the candidate executable code may be run, one or more may be selected to run, or some other approach. For example, executing 220 diploid candidate executable code may include executing each code set of the diploid candidate executable code and blending the two results, choosing one of the two results based on fitness or validity, or the like. For example, in the tic tac toe example, executing 220 diploid candidate executable code may include executing each code set of the candidate executable code and if one outcome is invalid, only taking the other outcome, and otherwise, choosing which outcome to use based on other criteria such as choosing to use the same or different code set from the last choice, choosing at random, mixing portions of the results together, choosing based on a voting mechanism, etc.

The candidate executable code sets are chosen 230 based on a fitness function. As mentioned elsewhere herein, a fitness function may be run on each candidate executable code set executed. The fitness function may be any appropriate function. In some embodiments, the fitness function depends on the domain of the candidate executable code and can be a measure of performance of the candidate executable code as compared to other candidate executable code. For example, the fitness function may be a measure of the speed, processing efficiency, or some other measure of performance. For example, in the image recognition realm, a fitness function may be speed of recognizing characters in an image, accuracy (as measured by completeness, number of false positives and negatives, etc.). In the case of tic tac toe, the fitness function may be a measure of wins, losses, and draws, with each contributing to a point total (e.g., $100*wins-50*losses+10*draws$ or $10*wins^2-7*losses^2+11*draws$).

In some embodiments, a fitness score (whether for choosing 230, or elsewhere) may also be altered. For example, a score may be computed and then altered, the fitness score itself may be temporarily or permanently altered (e.g., for all subsequent determinations of fitness), etc. Further, in some embodiments, altering a fitness score may happen for each determination of a fitness score, for one or more randomly chosen fitness scores, for fitness scores at a certain pattern (e.g., every $5^{th}$ fitness score; every $3^{rd}$ haploid fitness score and every $9^{th}$ diploid fitness score; if the fitness score is above and/or below a certain threshold; etc.). Further, altering a score may, in some embodiments, include resampling the fitness score. Resampling the fitness score may include, in some embodiments, resampling using the maximum entropy distribution. For example, if a score is known to be nonnegative but no other domain knowledge is known about the distribution of scores, a resample may consist of drawing a random number from the maximal entropy distribution for a nonnegative number for a given mean, namely an exponential distribution, whose mean is represented by the original score. The fitness score may also be calculated based in part on fitness scores of "parent" candidate executable code. For example, if candidate executable code has parent candidate executable code A, A' and B, B' going back two "generations", then the fitness score may be a function of the current candidate executable code fitness and the fitness scores of A, A', B, and B'. Further, the effect or contribution of the patents' and other ancestor fitness scores may phase out over time. For example, in some embodiments, the parents' fitness score may be multiplied by a coefficient less than one and added to the current fitness score, the generation before, which would have also been included in the parents' score and multiplied by a coefficient less than one, would therefore be further reduced in impact, etc. Additionally, if candidate executable code remains or is otherwise a candidate for more than one generation, its own fitness score from previous generations may also be used in addition to its fitness score from the current generation. For example, a current fitness score, may be a weighted sum of the fitness score from the current generation and the fitness score from the previous generation, such as 0.5*current_generation_fitness+0.5*previous_generation_fitness.

Choosing 230 candidate executable code based on a fitness score may include choosing 230 the top X candidate executable code based on score, choosing 230 all candidate executable code that reach a particular score, choosing 230 the top candidate executable code, dropping the bottom Y candidate executable code, dropping candidate executable code that does not meet some threshold, and/or some combinations of these and or other factors. In some embodiments, all candidate executable code sets are chosen 230. In some embodiments, the choosing 230 candidate executable code may differ based on the ploidy of the code. For example, the top X % or XX number of haploids may be chosen and the top Y % or YY number of diploid cases may be chosen 230.

New candidate executable code sets are created 240 based on those chosen 230. The process for creating new candidate executable code sets are described with respect to FIG. 1, FIG. 4, and elsewhere herein.

If an exit condition is not met 250, then the process 200 may iterate, returning to execute 220 pools of candidate executable code.

If an exit condition is met 250, then the resultant executable code set(s) are provided 260. In some embodiments, an exit condition is met 250 if a certain number of cycles of process 200 have been reached, if there one or more of the candidate executable code sets has met a fitness threshold, if the pool of candidate executable code has grown or shrunk to a particular set, if a particular amount of processing has been done or time has passed, etc. For example, in the tic tac toe example, if one tic tac toe candidate executable code meets 250 a certain threshold fitness score, then the process 200 may terminate, and the resultant executable code that met the fitness threshold may be provided 260. In other embodiments, more than one resultant executable code may be provided 260.

Example Systems for Evolution of Executable Code

FIG. 3 depicts an example system 300 for executable code evolution. System 300 includes a number of elements connected by a communicative coupling or network 390. Examples of communicative coupling and networks are described elsewhere herein. In some embodiments, the processes 100 and 200 of FIGS. 1 and 2 may run on the system 300 of FIG. 3 and the hardware 500 of FIG. 5. For example, the receiving 110 and 120 in FIG. 1 may be handled at evolution control engine 310 as well as the receipt 130, processing 140 and 141, and optional mutation 150 and 151. The resultant executable code might be made available 160 and 161 by being stored at evolution control engine 310 and/or communicatively coupled storage 330 or 340. A resultant process control engine 320 may execute the resultant code produced by processes 100 and 200.

Each of evolution control engine 310 and resultant process control engine 320 may run on a single computing device, multiple computing devices, in a distributed manner across a network, on one or more virtual machines, which themselves run on one or more computing devices. In some embodiments, evolution control engine 310 and resultant process control engine 320 are distinct sets of processes running on distinct sets of computing devices. In other embodiments, evolution control engine 310 and resultant process control engine 320 are intertwined or share processes or functions and/or run on the same computing devices. In some embodiments, storage 330 and 340 are communicatively coupled to evolution control engine 310 and resultant process control engine 320 via a network 390 or other connection. Storage 330 and 340 may also be part of or integrated with evolution control engine 310 and/or resultant process control engine 320 via a network 390 or other connection.

As discussed herein the various processes 100, 200, etc. may run in parallel, in conjunction, together, or one process may be a subprocess of another. Further, any of the processes may run on the systems or hardware discussed herein.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
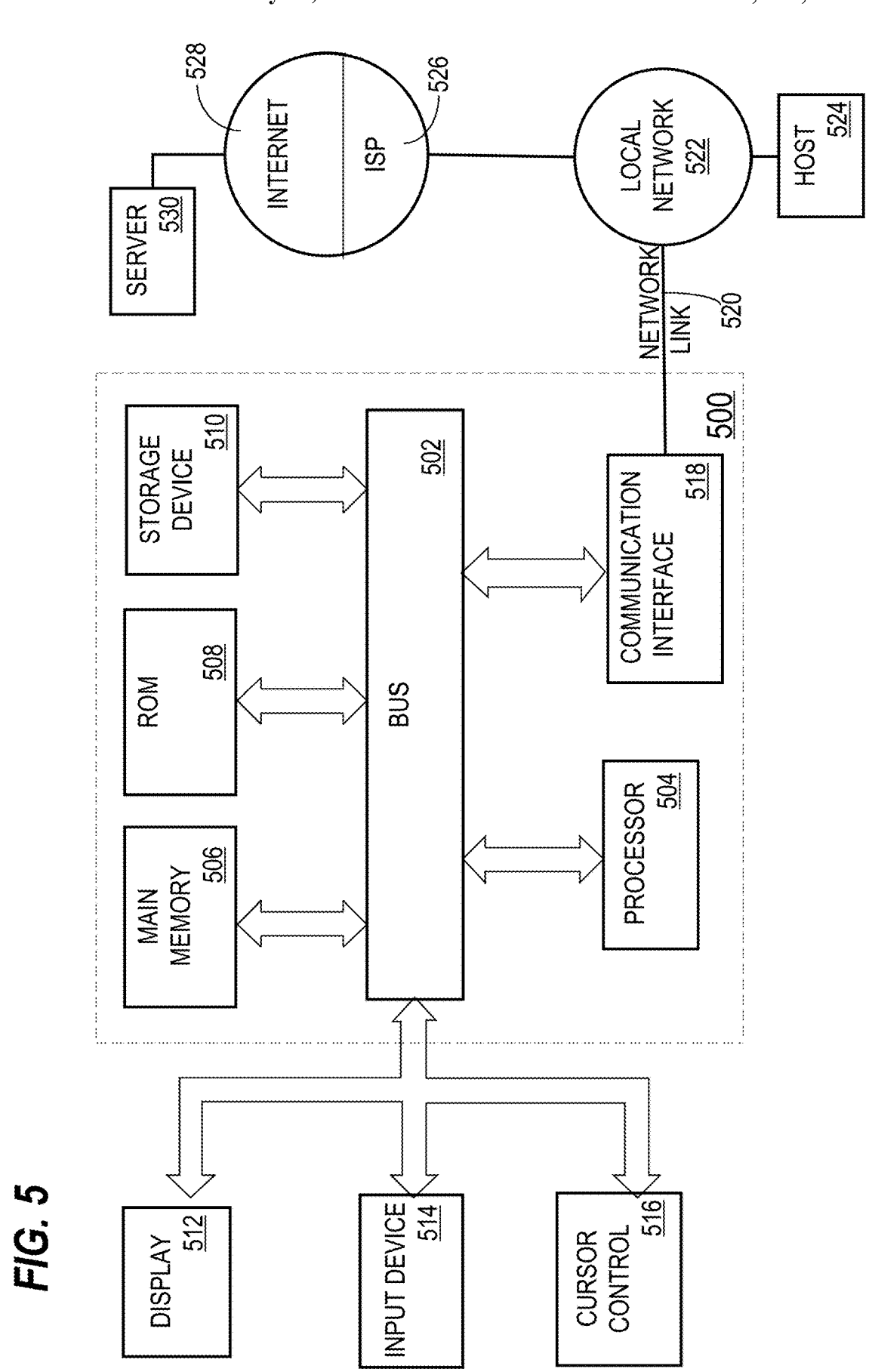
FIG. 5 depicts example systems and hardware for evolutionary techniques for computer-based optimization and artificial intelligence systems.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as an OLED, LED or cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. The input device 514 may also have multiple input modalities, such as multiple 2-axes controllers, and/or input buttons or keyboard. This allows a user to input along more than two dimensions simultaneously and/or control the input of more than one type of action.

Computer system 500 may implement the techniques described herein using customized hard-wired logic, one or more ASICs or FPGAs, firmware and/or program logic which in combination with the computer system causes or programs computer system 500 to be a special-purpose machine. According to some embodiments, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium storing instructions which, when executed by one or more computing devices, cause the one or more computing devices to perform operations comprising:
    receiving first candidate executable code, wherein the first candidate executable code is selected at least in part based on a first fitness score for the first candidate executable code and first ploidy of the first candidate executable code is at least two;
    receiving second candidate executable code, wherein the second candidate executable code is selected at least in part based on a second fitness score for the second candidate executable code and second ploidy of the second candidate executable code is at least one;
    determining a ploidy for resultant executable code;
    when the determined ploidy for the resultant executable code is one, crossing over a first part of the first candidate executable code and a second part of the first candidate executable code to produce resultant executable code, wherein the resultant executable code is haploid;

when the determined ploidy of the resultant executable code is two, combining the first candidate executable code and the second candidate executable code to produce the resultant executable code, wherein the resultant executable code is diploid;

determining a third fitness score for the resultant executable code;

determining whether the resultant executable code will be used as a future candidate executable code based at least in part on the third fitness score; and when an exit condition is met, indicating the resultant executable code as evolved executable code based at least in part on the exit condition being met.

2. The non-transitory computer readable medium of claim 1, wherein the first candidate executable code is diploid candidate executable code and the second candidate executable code is haploid candidate executable code, and the first candidate executable code has twice as much executable code as the second candidate executable code.

3. The non-transitory computer readable medium of claim 2, wherein, when the determined ploidy of the resultant executable code is two, then combining the first candidate executable code and the second candidate executable code comprises crossing over the two halves of the first candidate executable code to produce a first half of the resultant executable code and copying the haploid candidate executable code to produce a second half of the resultant executable code.

4. The non-transitory computer readable medium of claim 1, wherein the one or more computing devices are further caused to: mutate the resultant executable code before determining the third fitness score for the resultant executable code.

5. The non-transitory computer readable medium of claim 1, wherein determining the third fitness score for the resultant executable code comprises processing inputs using resultant executable code to determine the third fitness score.

6. The non-transitory computer readable medium of claim 1, wherein, when the determined ploidy of the resultant executable code is two, determining the third fitness score comprises executing executable elements of a first half of the resultant executable code, a second half of the resultant executable code, and determining the third fitness score based at least in part on the two results.

7. The non-transitory computer readable medium of claim 1, wherein a fitness score for executable code is a measure of a performance characteristic of the executable code.

8. The non-transitory computer readable medium of claim 7, wherein the fitness score for executable code has a phase out characteristic related to previous measures of performance characteristic of the executable code.

9. The non-transitory computer readable medium of claim 7, wherein the fitness score includes a random factor that alters the fitness score randomly.

10. The non-transitory computer readable medium of claim 1, wherein determining the ploidy of the resultant executable code comprises selecting randomly between haploid and diploid.

11. The non-transitory computer readable medium of claim 10, wherein determining the ploidy of the resultant executable code comprises selecting the ploidy of the resultant executable code based at least in part on a desired ratio of haploid and diploid resultant executable code.

12. The non-transitory computer readable medium of claim 1, wherein the exit condition is based at least in part on one of the third fitness score and a number of iterations.

13. A non-transitory computer readable medium storing instructions which, when executed by one or more computing devices, cause the one or more computing devices to perform operations comprising:

receiving haploid candidate executable code, wherein the received haploid candidate executable code is selected at least in part based on a first fitness score for the haploid candidate executable code;

receiving diploid candidate executable code, wherein the received diploid candidate executable code Is selected at least in part based on a second fitness score for the diploid candidate executable code;

determining a ploidy of resultant executable code;

when the determined ploidy is haploid, then crossing over a first half of the diploid candidate executable code with a second half of the diploid executable code to form a resultant executable code, wherein the resultant executable code is haploid;

when the determined ploidy is diploid, then crossing over the first half of the diploid candidate executable code with the second half of the diploid executable code to form the first half of the resultant executable code, and determining the second half of the resultant executable code based on the haploid candidate executable code, wherein the resultant executable code is diploid;

determining a third fitness score for the resultant executable code;

determining whether the resultant executable code will be used as a future candidate executable code based at least in part on the third fitness score; and when an exit condition is met, indicating the resultant executable code as evolved executable code based at least in part on the exit condition being met.

14. The non-transitory computer readable medium of claim 13, wherein the one or more computing devices are further caused to: mutate the resultant executable code before determining the third fitness score for the resultant executable code.

15. The non-transitory computer readable medium of claim 13, wherein, when the determined ploidy of the resultant executable code is two, determining the third fitness score comprises executing executable elements of the first half of the resultant executable code, the second half of the resultant executable code, and determining the third fitness score based at least in part on the two results.

16. The non-transitory computer readable medium of claim 13, wherein the exit condition is based at least in part on one of the third fitness score and a number of iterations.

17. A method comprising:

receiving first candidate executable code, wherein the first candidate executable code is selected at least in part based on a first fitness score for the first candidate executable code and first ploidy of the first candidate executable code is at least two;

receiving second candidate executable code, wherein the second candidate executable code is selected at least in part based on a second fitness score for the second candidate executable code and second ploidy of the second candidate executable code is at least one;

determining a ploidy for resultant executable code;

when the determined ploidy for the resultant executable code is one, crossing over two halves of the first candidate executable code and the second candidate executable code to produce resultant executable code, wherein the resultant executable code is haploid;

when the determined ploidy of the resultant executable code is two, combining the first candidate executable code and the second candidate executable code to produce the resultant executable code, wherein the resultant executable code is diploid;

determining a third fitness score for the resultant executable code;

determining whether the resultant executable code will be used as a future candidate executable code based at least in part on the third fitness score; and when an exit condition is met, indicating the resultant executable code as evolved executable code based at least in part on the exit condition being met.

18. The method of claim 17, wherein the first candidate executable code is diploid candidate executable code and the second candidate executable code is haploid candidate executable code, and, when the determined ploidy of the resultant executable code is one, combining the first candidate executable code and the second candidate executable code comprises crossing over a first half of the diploid candidate executable code and a second half of the first candidate executable code to produce resultant executable code.

19. The method of claim 17, wherein the first candidate executable code is diploid candidate executable code and the second candidate executable code is haploid candidate executable code, and, when the determined ploidy of the resultant executable code is two, combining the first candidate executable code and the second candidate executable code comprises crossing over the two halves of the diploid candidate executable code to produce a first half of the resultant executable code and copying the haploid candidate executable code to produce a second half of the resultant executable code.

* * * * *

UNITED STATES PATENT AND TRADEMARK OFFICE
CERTIFICATE OF CORRECTION

PATENT NO.           : 11,010,672 B1                                        Page 1 of 1
APPLICATION NO.      : 15/694586
DATED                : May 18, 2021
INVENTOR(S)          : Christopher James Hazard It is certified that error appears in the above-identified patent and that said Letters Patent is hereby corrected as shown below:

On the Title Page

Item (73) Please remove "Google LLC" as the Assignee and replace it with "Diveplane Corporation."

Signed and Sealed this
Sixth Day of May, 2025

Coke Morgan Stewart
*Acting Director of the United States Patent and Trademark Office*